US008543705B2

(12) United States Patent
Cagenius

(10) Patent No.: US 8,543,705 B2
(45) Date of Patent: Sep. 24, 2013

(54) METHOD AND ARRANGEMENT FOR ENABLING MULTIMEDIA COMMUNICATION

(75) Inventor: Torbjörn Cagenius, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 409 days.

(21) Appl. No.: 12/094,831

(22) PCT Filed: Nov. 24, 2005

(86) PCT No.: PCT/SE2005/001765
§ 371 (c)(1),
(2), (4) Date: Oct. 30, 2008

(87) PCT Pub. No.: WO2007/061345
PCT Pub. Date: May 31, 2007

(65) Prior Publication Data
US 2009/0083426 A1  Mar. 26, 2009

(51) Int. Cl.
*G06F 15/16* (2006.01)
*G06F 9/00* (2006.01)
*G06F 17/00* (2006.01)

(52) U.S. Cl.
USPC .......................................... 709/227; 726/12

(58) Field of Classification Search
None
See application file for complete search history.

(56) References Cited

U.S. PATENT DOCUMENTS

| | | | |
|---|---|---|---|
| 6,788,676 B2 * | 9/2004 | Partanen et al. | 370/352 |
| 7,529,839 B2 * | 5/2009 | Varga et al. | 709/227 |
| 7,647,493 B2 * | 1/2010 | Bajko et al. | 713/152 |
| 2002/0026482 A1 | 2/2002 | Morishige et al. | |
| 2002/0141389 A1 * | 10/2002 | Fangman et al. | 370/352 |
| 2004/0025186 A1 * | 2/2004 | Jennings et al. | 725/93 |
| 2004/0085949 A1 * | 5/2004 | Partanen et al. | 370/352 |
| 2004/0151290 A1 * | 8/2004 | Magarasevic et al. | 379/93.05 |

FOREIGN PATENT DOCUMENTS

| | | |
|---|---|---|
| JP | H04-245756 A | 9/1992 |
| JP | H04-276955 A | 10/1992 |
| WO | WO2004/062229 | 7/2004 |

OTHER PUBLICATIONS

Interface vol. 18 No. 6 p. 178-196.

* cited by examiner

Primary Examiner — Azizul Choudhury

(57) ABSTRACT

A method and arrangement in a multimedia gateway connected to a multimedia service network, for providing access to multimedia services for communication devices connected to a private network. The multimedia gateway may include a device database, a communication unit and a logic unit. A service identity is associated with the multimedia gateway and is valid in the multimedia service network. When a session request is received, a session is established on behalf of at least one device in the private network using said service identity and capabilities of said at least one device. Thereby, no individual service identity is necessary for the selected device(s). If the session request is a session invitation of an incoming request, said at least one device is selected based on capability requirements for the session.

24 Claims, 3 Drawing Sheets

METHOD AND ARRANGEMENT FOR ENABLING MULTIMEDIA COMMUNICATION

TECHNICAL FIELD

The present invention relates generally to a method and arrangement for enabling multimedia communication by means of a multimedia gateway connected to a multimedia service network. Access to multimedia services can then be provided for devices connected to a private network, particularly different types of communication devices in a residential network.

BACKGROUND OF THE INVENTION AND PRIOR ART

Various communication devices are available today that are capable of packet-based multimedia communication using IP (Internet Protocol), such as either fixed or mobile computers and telephones. Multimedia services typically entail transmission of encoded data representing media in different formats and combinations. The term "multimedia" will be used in this description to generally represent any choice of media communicated by using the packet based IP (Internet Protocol) transport technology. Multimedia services involves packet-switched communication of data representing different types of media, such as audio, video, images, text, documents, animations, etc.

A network architecture called "IP Multimedia Subsystem" (IMS) has been developed by the 3$^{rd}$ Generation Partnership Project (3GPP) as an open standard for handling multimedia services and sessions in the packet domain. IMS is a platform for enabling services based on IP transport, more or less independent of the access technology used and not restricted to any specific services. Thus, an IMS network controls multimedia sessions but is not used for the actual transfer of payload data which is routed over access networks and any intermediate transport networks including the Internet.

FIG. 1 is an exemplary schematic illustration of a basic network structure for providing multimedia services by means of an IMS service network. A mobile terminal A is connected to a radio access network 100 and communicates with a fixed terminal B connected to another access network 102, in a communication session S involving one or more multimedia services. There may also be an intermediate backbone network as well, not shown, linking the access networks 100 and 102.

An IMS network 104 is connected to the radio access network 100 and handles the session with respect to terminal A, where networks 100, 104 are typically owned by one operator. In this example, a corresponding IMS network 106 handles the session on behalf of terminal B, and the two IMS networks 104 and 106 may be controlled by different operators. Alternatively, two communicating terminals may of course be connected to the same access network and/or may belong to the same IMS network. Terminal A may also communicate with a server instead, e.g. for downloading some media from a content provider. Moreover, if a terminal is roaming in a visited access network, multimedia services are handled by the terminal's "home" IMS network, i.e. where it is registered as a subscriber.

The session S shown in FIG. 1 is managed by specific nodes in each IMS network, here generally referred to as "session managing nodes" 108. These nodes typically include S-CSCF (Serving Call Session Control Function), I-CSCF (Interrogating Call Session Control Function) and P-CSCF (Proxy Call Session Control Function). Each IMS network 104,106 also includes one or more application servers 110 for enabling various multimedia services. Further, a main database element HSS (Home Subscriber Server) 112 stores subscriber and authentication data as well as service information, among other things. IMS network 106 is basically similar to network 104. The various specific functions of the shown network elements 108-112 are generally known in the art, but are not necessary to describe here further to understand the context of the present invention. Of course, the IMS networks 104,106 contain numerous other nodes and functions not shown here for the sake of simplicity.

A specification called "SIP" (Session Initiation Protocol, according to the standard IETF RFC 3261) is used for handling sessions in IMS networks. SIP is an application-layer control protocol for signalling, to create and generally handle sessions over a packet-switched logic. The SIP standard can thus be used by IMS systems and terminals to establish and control IP multimedia communications. SIP itself does not provide multimedia services, but rather makes available a set of primitives that other protocols or applications can use to actually implement such services. For example, a message called "INVITE" is defined in SIP to initiate a session during a set-up procedure, when a certain application has been invoked.

In SIP, an additional protocol is used called "Session Description Protocol SDP", for describing multimedia sessions by means of an SDP message, which can be embedded as a self-contained body within SIP messages. SDP can thus be used by terminals to provide information regarding their specific capabilities and preferences, in order to negotiate and agree on which session parameters, in particular codecs as well as an IP address and port for media, to use during a forthcoming multimedia session, as is well-known in the art. The above-mentioned SIP INVITE message includes the SDP message with information on one or more required codecs (coders/decoders) and other communication parameters needed for the forthcoming session.

According to 3GPP, it is required that a subscribing communication terminal accessing an IMS network has access to an IMS SIM or "ISIM" (IMS Subscriber Identity Module) application, in order to provide necessary authentication and subscriber data to an operator of the IMS network. Today, only IMS enabled terminals are allowed to access an IMS network.

An ISIM application is typically installed on a Universal Integrated Circuit Card (UICC), analogous to the well-known SIM card for GSM terminals. Terminals equipped with ISIM are referred to as "IMS enabled" terminals. Among other things, an ISIM stores an IMS Private Identity referred to as "IMPI" and at least one IMS Public Identity referred to as "IMPU", which are both known to the IMS network. IMPI is used for authentication and is not to be disclosed to third parties, whereas IMPU can be used by anyone to identify subscribers and/or their equipment when participating in IMS services, as analogous to an e-mail address or a telephone number. The intention is that each IMPU is associated with an IMS service profile.

While the IMS concept was primarily conceived to enable multimedia services for mobile IP terminals, it can be used regardless of access technology, as mentioned above. In the European Telecommunications Standards Institute (ETSI), a working group called TISPAN (Telecom and Internet Services and Protocols for Advanced Networks) is currently working with the adoption of IMS in fixed networks. It is now also desirable to provide such IMS-based services for a variety of IP terminals connected to a local or private network, particularly a residential or office network environment using, e.g., conventional LAN (Local Area Network) equipment and protocols. The generic term "private network" will be used in the following description to represent any such networks, including LAN, WAN (Wide Area Network) and WLAN (Wireless Local Area Network). Further, the term "device" will be used for any terminal in the private network capable of IP communication.

A private network may include fixed or wireless communication devices that are not IMS enabled, even though they may be "SIP enabled", while other communication devices in the private network may be neither IMS enabled nor SIP enabled. For example, such plain devices may include fixed and cordless telephones, as well as PC's and so-called STB's (Set Top Boxes) for television sets. The large amount of such existing "home devices" makes it desirable to provide for an inter-working solution between non-IMS devices and the IMS network, to enhance the market for multimedia services.

In order to provide IMS services to non-IMS enabled communication devices, e.g. connected to a private residential or office network, a multimedia gateway referred to as a "Home IMS Gateway HIG", has been defined that can act as an IMS enabled terminal on behalf of any communication device connected thereto. This type of Home IMS Gateway is described in applicant's earlier patent application PCT/EP2005/055248. Among other things, the HIG includes a SIP "Back-to-Back User Agent" (B2BUA) for interworking between SIP enabled but non-IMS enabled devices and the IMS network. The B2BUA is equipped with an ISIM application and handles IMS signalling on behalf of SIP devices, such that all signalling concerning an SIP device is associated with the corresponding IMPI on the ISIM application. For example, an SIP enabled device may send an SIP REGISTER message to the HIG, containing only an SIP identity. The HIG will then translate the message into an IMS REGISTER message that contains both an IMPI and an IMPU, according to regular IMS procedures.

A typical scenario for using a HIG is generally outlined in FIG. 2, illustrating a private or "home" environment 200, such as a family residence or an office, that contains a plurality of different IP communication devices linked together in a private network 202. As illustrated here, these devices may include a wireline telephone, a cordless telephone, a TV set, a server and a PC, and these will be simply referred to as "devices" hereafter.

The private network 202 includes a conventional residential gateway RGW 204 which is connected to an external access network 206, providing a communication link for media M to and from the devices in network 202. Although not specifically illustrated here, the RGW 204 typically includes NAT (Network Address Translation) and firewall functions, and also a local DHCP (Dynamic Host Configuration Protocol) server providing private IP addresses to the devices, as is well-known in the art.

The private network 202 further includes a HIG 208 providing a connection to an IMS network, here illustrated as an IMS core 210 containing an HSS 212, among other things. The HIG 208 is equipped with interfaces towards the different types of devices for signalling, using device-specific protocols. In the patent application PCT/EP2005/055248, the basic functional architecture of HIG, including various interfaces, protocol translation and gateway functions, is described in detail. However, these configuration specifics are not necessary to describe here further in order to understand the present invention. In practice, the described HIG functionality may be implemented as a separate node, or in an RGW, or even in an IMS enabled terminal. However, it is considered as a separate functional unit in this description regardless of implementation.

In the HIG 208, identity information 214 is stored for each of the devices in the network 202, typically including the above-mentioned IMPU, which is valid for accessing the IMS core 210 where the same identity information is also stored as subscriber information 216 in the HSS 212, as indicated in the figure. The patent application PCT/EP2005/055248 outlines how different combinations of IMPI and IMPU can be used in this context. Thus, each device in network 202 has been assigned a valid IMS identity, e.g. including an IMPU, which is associated with its local IP address. The identity information 214 is typically stored in an ISIM application implemented in the HIG 208.

Thus, when a device in network 202 sends a request for an IMS service, using a protocol within its capability, the HIG 208 identifies the device by means of its local IP address, and retrieves the IMS identity 214 associated with that device. Then, the HIG can translate the received service request and create a valid SIP-based IMS request (e.g. SIP INVITE) on behalf of the device, using the retrieved IMS identity 214. HIG 208 will then set up a session for the device by communicating suitable SIP messages with the IMS core 210, accordingly.

In a similar manner, an incoming call involving an IMS service, that may be addressed to one of the devices or generally to the private home or office, can be set up by the HIG on behalf of a device using an IMS identity 214 associated with the device. The call can then be routed to the called device over the RGW 204 to communicate media M. In this way, the IMS core will perceive the device 202 as an IMS enabled device, and the device will use the HIG 208 as a proxy for accessing services offered by means of the IMS network.

However, this procedure requires that a valid IMS identity must be assigned for each device in the private network 202, including necessary authentication data, in the HIG. The IMS network operator typically hands out IMS identities which also must be registered in the IMS network as subscriber information stored in the HSS 212. Each time a device is added to the network, a new IMS identity must be assigned thereto. Consequently, the IMS identity setup at both locations 208, 212 must be modified each time a device is added or removed from the local environment, i.e. the private network 202.

This somewhat inflexible solution places an unwanted administration burden on the user and the IMS operator, and it is not evident how a user should handle the IMS identities, e.g. IMPU's. Moreover, the IMS network may become loaded with numerous IMS identities and subscriptions that must be managed. A more flexible and convenient solution is thus desirable for providing access to IMS services for non-IMS enabled devices.

SUMMARY OF THE INVENTION

It is an object of the present invention to generally avoid or at least reduce the problems outlined above. More specifically, it is an object of the present invention to make it possible to avoid individual assignment of IMS identities to each device in a private network.

These objects and others can be obtained by providing a method and a multimedia service gateway according to the independent claims attached below.

In the inventive method of providing access to multimedia services for communication devices connected to a private network, by means of a multimedia gateway connected to a multimedia service network, a session request is initially received. A session is then established in a negotiation procedure on behalf of at least one device in the private network in response to the session request, using a valid service identity associated with the multimedia gateway, and using the capabilities of said at least one device.

In a first example, the session request may be a session invitation of an incoming request to the private network, and said at least one device is then selected from said communication devices based on capability requirements for the session. The capability requirements may be indicated by proposed session parameters in the received session invitation, and the session parameters are then compared with capabilities of devices in the private network, for selecting said at least one device. The capabilities of devices may be retrieved from a device database in the multimedia gateway, or by requesting them from the devices. The device capabilities may refer to at least one of: at least one media codec, transmission speed ability and storage capacity.

The session invitation may be an SIP INVITE message and the proposed session parameters may be included in an SDP message embedded in the SIP INVITE message. Said at least one device may be selected further based on predefined rules or policies. Plural devices may also be selected for the session, for receiving different combined media streams, or for receiving the same media stream(s) simultaneously on the selected devices.

Individual service identities may be assigned in the multimedia gateway for certain persons and/or devices in the private network, such that multimedia sessions can be established on behalf of said persons and/or devices using their corresponding individual service identities and capabilities.

In a second example, the session request may relate to an outgoing request from a requesting device of the private network, and capabilities of the requesting device are then used when establishing the session. The capabilities of the requesting device may be retrieved from a device database in the multimedia gateway.

Session specific information may be stored in a session mapping table, which can be used for further signalling related to the session. The session specific information may include a Call ID defining the session, a local IP address and selected port of said at least one device, a reserved port of a residential gateway of the private network, and an IP address of a remote party. The service identity associated with the multimedia gateway may include an IMPU.

The inventive arrangement in a multimedia gateway connected to a multimedia service network, for providing access to multimedia services for communication devices connected to a private network, comprises means for receiving a session request, and means for establishing a session in a negotiation procedure on behalf of at least one device in the private network in response to said session request, using a valid service identity associated with the multimedia gateway, and using the capabilities of said at least one device.

In the case when the session request is a session invitation of an incoming request to the private network, the arrangement further comprises a logic unit adapted to select said at least one device from said communication devices in the private network based on capability requirements for the session. The capability requirements may indicated by proposed session parameters in the received session invitation, and the logic unit may then be further adapted to compare said session parameters with capabilities of devices in the private network, for selecting said at least one device.

The logic unit may further be adapted to retrieve said capabilities of devices in the private network from a device database in the multimedia gateway, or by requesting them from the devices. Said device capabilities may refer to at least one of: at least one media codec, transmission speed ability and storage capacity. The session invitation may be an SIP INVITE message and the proposed session parameters may be included in an SDP message embedded in the SIP INVITE message.

The logic unit may be further adapted to select said at least one device further based on predefined rules or policies. The logic unit may be further adapted to select plural devices for the session, for receiving different combined media streams or for receiving the same media stream(s) simultaneously on the selected devices.

The arrangement may further comprise means for assigning individual service identities in the multimedia gateway for certain persons and/or devices in the private network, such that multimedia sessions can be established on behalf of said persons and/or devices using their corresponding individual service identities.

In the case when the session request relates to an outgoing request from a requesting device of the private network, the arrangement may further comprise means for using capabilities of the requesting device when establishing the session. The arrangement may further comprise means for retrieving said capabilities of the requesting device from a device database in the multimedia gateway.

The arrangement may further comprise means for storing session specific information in a session mapping table which can be used for further signalling related to the session. The session specific information may include a Call ID defining the session, a local IP address and selected port of said at least one device, a reserved port of a residential gateway of the private network, and an IP address of a remote party. The service identity associated with the multimedia gateway may include an IMPU.

Further possible features and benefits of the present invention will be explained in the detailed description below.

BRIEF DESCRIPTION OF THE DRAWINGS

The present invention will now be described in more detail by means of preferred embodiments and with reference to the accompanying drawings, in which.

DESCRIPTION OF PREFERRED EMBODIMENTS

Briefly described, the present invention enables multimedia communication for any IP communication device connected to a private network, by means of a shared service identity associated with a multimedia gateway. Thus, a shared service identity that is valid in a multimedia service network, is used by the multimedia gateway for accessing the service network on behalf of devices in the private network. By using a shared service identity for a plurality of devices connected to the private network, it is not necessary to assign specific individual service identities to each device to obtain access to multimedia services. Thereby, it is sufficient to register the multimedia gateway and its identity with the multimedia service network, to cater for plural devices in the private network, which will reduce the number of registrations in the service network. Further advantages will become apparent in the following detailed description of embodiments of the present invention.

In this description, the multimedia gateway will be referred to as an HIG (Home IMS Gateway) connected to an IMS (IP Multimedia Subsystem) network. However, the present invention is basically not limited to these specific terms, nor to any specific protocols and standards referred to in the following.

Figure 1:
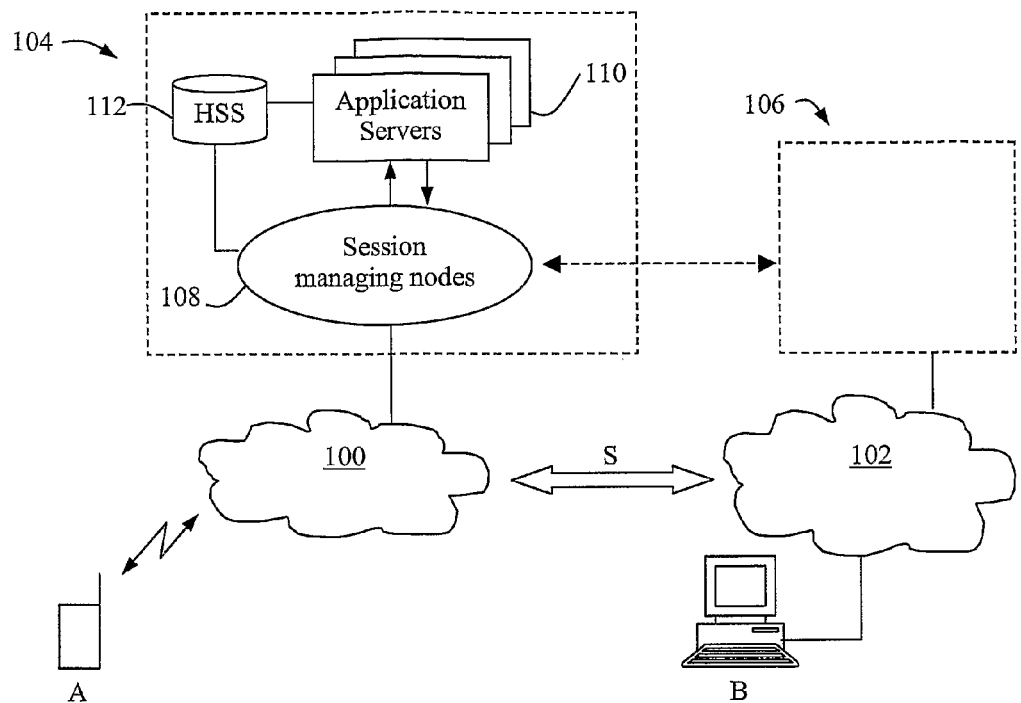
FIG. 1 is a schematic view of a conventional network structure for communicating multimedia between two communication terminals.
Figure 2:
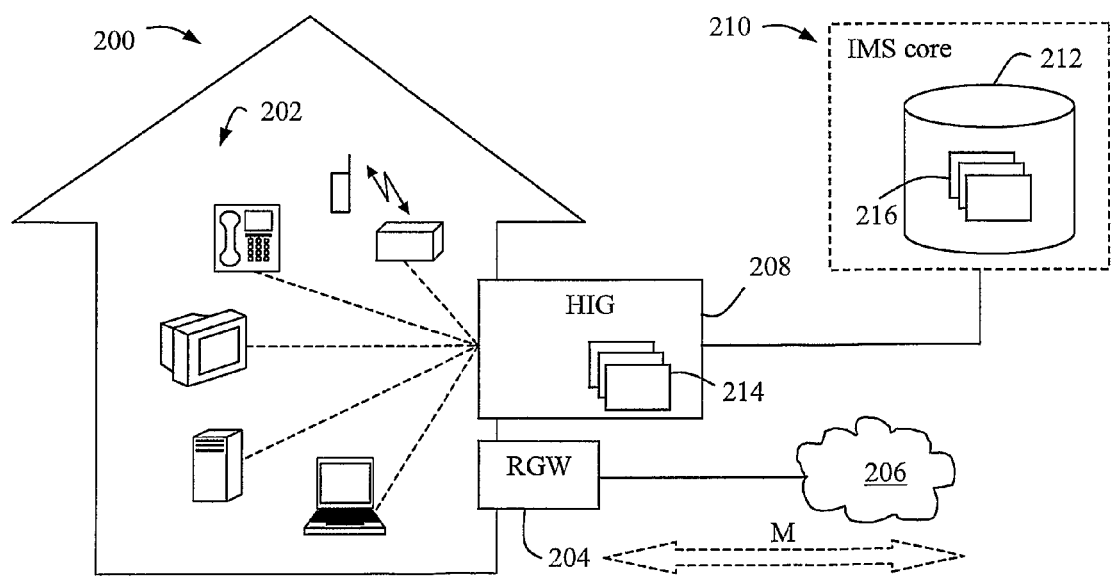
FIG. 2 is a schematic view of a residential network with access to multimedia services by means of a local "Home IMS Gateway HIG", according to the prior art.
Figure 3:
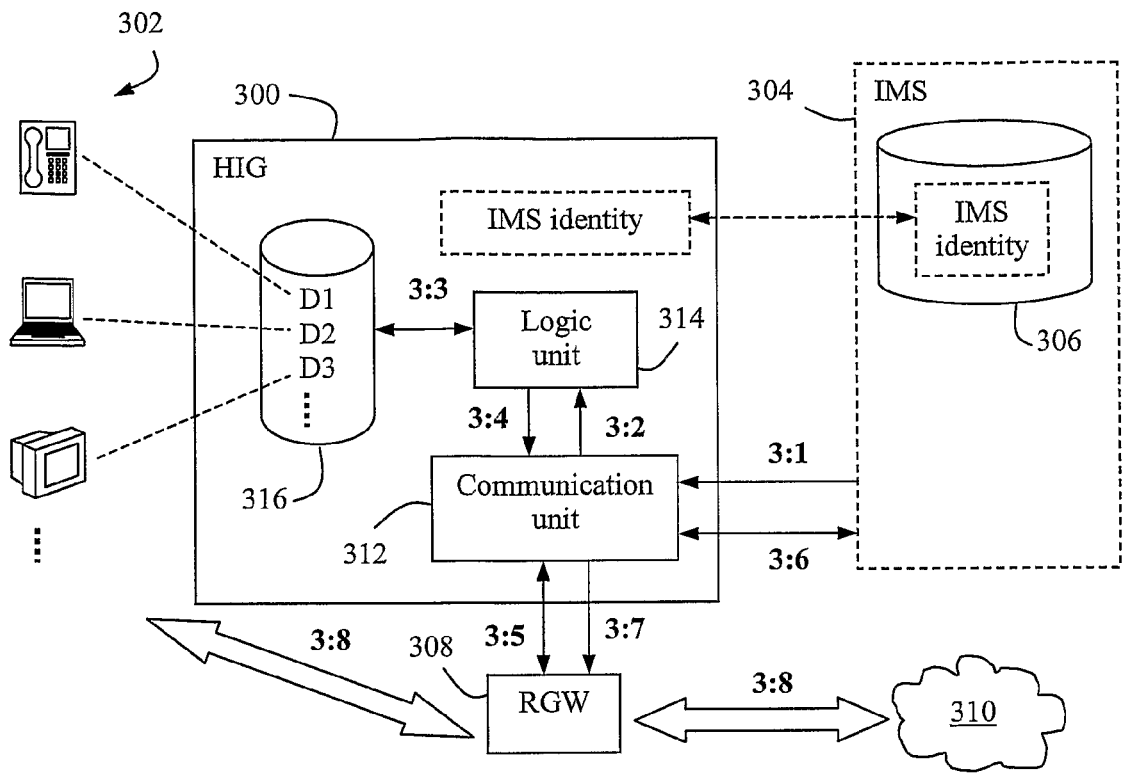
FIG. 3 is a block diagram of a multimedia gateway when used for setting up a multimedia session for an incoming call, in accordance with one embodiment.

FIG. 3 illustrates a multimedia gateway or HIG 300 when used for setting up a multimedia session for an incoming call, in accordance with one embodiment. Similar to FIG. 2, the HIG 300 is a gateway between a plurality of devices 302 in a private network and a multimedia service network, here indicated as an IMS network 304. It is assumed that the shown devices 302 are non-IMS enabled, just as described above for FIG. 2, although the present invention does not exclude the use of IMS enabled devices as well. The HIG 300 is provided with protocols and interfaces adapted to each connected device.

The HIG 300 has an IMS identity which is valid in the IMS network 304 and stored as a subscription in an HSS 306 therein, as indicated by dashed boxes. According to the current standard, the required IMS identity comprises an IMPI/IMPU combination, but the present invention is generally not limited in this respect. The HSS 306 further stores subscriber and authentication data, not shown, associated with the IMS identity. Thus, the HIG 300 is registered with the IMS network 304 as a subscriber equivalent to any IMS-enabled communication terminal, such that the IMS network perceives the HIG as a single IMS terminal. All non-IMS enabled devices can then be reached using the identity of the HIG, once they are locally registered with the HIG.

The devices 302 in the private network are further connected to a conventional network gateway RGW 308 which in turn is connected to an access network 310, for the communication of media. The HIG 300 comprises a communication unit 312 for communicating signalling messages with the IMS network 304, and a logic unit 314 for identifying and selecting devices in the private network for multimedia communication. The HIG 300 further comprises a device database 316 containing information on the devices 302 regarding their local identities, local IP addresses, current status, and capabilities with respect to multimedia communication, here schematically indicated as D1,D2,D3 . . . .

The device database 316 can then be used to select a suitable device for a multimedia session, e.g., depending on the nature of session. The device database 316 is gradually built up when devices enter the private network and registers locally with the HIG. Non-IMS devices may register with the HIG 300 using a suitable protocol, such as UPnP (Universal Plug-and-Play) or SIP, depending on the type of device, or any other suitable means to facilitate automatic registration. The device database 316 may be configured according to the following structure:

| Device ID | Local IP address | Status | Capabilities |
|---|---|---|---|
| Device 1 | IP address(1) | available | Audio = codec x . . . |
| Device 2 | IP address(2) | busy | Video = codec y . . . |
| Etc. | | | |

In the first column, a local identity is specified for each device, which may be, e.g., a UUID (Universally Unique Identifier) for UPnP devices, an SIP URI (Uniform Resource Locator) for SIP devices, or an FQDN (Fully Qualified Domain Name) for non-SIP and non-UPnP devices for which the host name may be their IP address. The second column includes the local IP address for each device, temporarily assigned by the RGW as described above. In the third column, a status is specified for each device, such as available, unavailable, busy, etc. In the last column, capabilities are specified for each device which typically include one or more codecs, and may also include transmission speed ability and storage capacity.

A procedure will now be described for establishing a multimedia session for a device in the private network in the case of an incoming call, with reference to steps 3:1-3:8 indicated in FIG. 3. In a first step 3:1, communication unit 312 in HIG 300 receives a session invitation from IMS network 304 that has been sent from another party, e.g. an IMS enabled terminal, not shown, addressed to a public identity part of the IMS identity of the HIG. The session invitation includes proposed session parameters such as a codec, among other things, and is typically an SIP INVITE message with an SDP message containing this information.

The proposed session parameters are then submitted to the logic unit 314 in a next step 3:2, which performs a "mapping" operation by comparing the proposed parameters, e.g. in the SDP, with information in the device database 316, in a following step 3:3. After considering various information in database 316 for the devices 302, one of them is selected as being the most suitable one for the forthcoming session, e.g. with respect to its capabilities and the proposed media format, provided that the current status of that device is indicated as available. Alternatively, the capabilities may be requested directly from the devices, e.g. using the UPnP protocol for plain IP devices, instead of retrieving them from the database 316 in step 3:3. If this procedure is used for retrieving device capabilities, it is not necessary to have them stored in the database 316.

The database 316 may also include priority indications, such that a user in the private network may prefer to receive certain calls on a specific device, e.g. depending on the media type and/or who the calling party is. For example, a user may prefer to receive calls from specific parties on a telephone located in his/her private room, whereas other calls are preferably received on another more openly located telephone. Alternatively, such priorities may be defined as rules or policies in the logic unit 314 dictating the selection operation.

It is also possible to select more than one device for the session. For example, it may be desirable to receive different combined media streams on different devices to achieve optimal play out quality. The same stream(s) may also be received simultaneously on devices at different locations, etc. The following description will be directed to the selection of only one device, though, for simplicity. In general, any rules or policies may be defined as an algorithm or the like for selecting a device, preferably implemented in the logic unit 314. Hence, the present invention provides for great flexibility in this respect.

After selecting a device, the communication unit 312 is ordered, in a next step 3:4, to establish a multimedia session on behalf of the selected device, using the IMS identity of the HIG towards the IMS network 304. In this step, the logic unit 314 also submits capability data of the selected device to the communication unit 312, to be used during the setup procedure.

The communication unit 312 now communicates with the RGW 308 in order to generally establish a communication link for the selected device, in a next step 3:5. This step may include the reservation of a port opening in the NAT/firewall of RGW 308 for one or more media streams of the session, e.g. via an internal UPnP control point. The communication unit 312 then accordingly exchange conventional signalling messages with the IMS network, e.g. according to SIP, as generally indicated in a following step 3:6, to set up the session with the calling party on behalf of the selected device. In the setup procedure, communication unit 312 responds to the initially received session invitation of step 3:1 using the shared IMS identity of the HIG and capability data of the selected device received in step 3:4 above and the RGW IP address and port received in step 3:5, which may be provided to the IMS network 304 in an SDP message embedded in a suitable SIP response message. In the response, communication unit 312 also provides the public IP address and selected port of the RGW 308 as the point of contact for the forthcoming session, which are also given in the SDP. After the session setup with the remote party is finalized, the communication unit has received the remote party's IP address.

The communication unit 312 further associates the remote party's IP address and the reserved port in RGW 308 with the local IP address of the selected device, which was found in the database 316 in previous step 3:3. This pair of IP addresses is also associated with a Call ID defining the session, which was typically given in the firstly received session invitation message SIP INVITE. This session specific information is stored in a session mapping table in the HIG 300, which can be used for further signalling related to this session. The session mapping table may have the following structure:

| IMS session | Remote party IP | RGW port | Device IP/port | Device ID |
|---|---|---|---|---|
| Sip:bob@imsop.com - Call ID | IP address (remote) | port Y | IP address (1): port X | Device 1 |

In the first column, the IMS session is defined by a caller identity and a call identity. The second column contains the public IP address of the remote party. Further, the third column contains the selected/reserved port of the RGW, as requested in step 3:5 above. In the fourth column, the local IP address of the device and a local port therein are specified. In the last column, a local identity is specified for the selected device, which may be, e.g., a UUID, an SIP URI, or an FQDN, i.e. basically information from the first column in the above-described table in the device database 316.

Next, the communication unit 312 requests the RGW to open the reserved port mappings in the NAT, including the finally negotiated parameters such as the remote party's IP address, in a step 3:7. Finally, the session can begin in a step 3:8, and any incoming media is mapped by the NAT in the RGW 308 to the local IP address and port of the selected device.

As mentioned above, the procedure of selecting a device for a forthcoming session of an incoming call can be executed according to different rules or policies, which will be described in more detail below. Moreover, it should be noted that the present invention does not exclude the use of individual IMS identities for certain persons and/or personal devices, in addition to the IMS identity of the HIG 300, the term "personal device" implying that the device has its own IMS identity defined in the HIG, e.g. including an individual IMPU. It is also possible for a person to use an individual IMPU for communication on any device in the private network. An individual IMS identity can thus be used by the HIG for establishing multimedia sessions on behalf of the corresponding personal device or person.

Incoming calls addressed to an individual IMS identity will naturally be connected to one or more personal devices associated with that IMS identity. For example, a member of a family may have one or more personal devices associated with his/her individual IMS identity, as well as common devices associated with the shared IMS identity of the HIG. For incoming calls directed to the shared IMS identity, a personal device may act as a common device as well, to be included as an option for device selection.

Different subsets of devices in a private network may thus be defined to dictate the selection of device, and it is up to its users to register such device subsets in the HIG. Calls directed to the IMS identity of the HIG will result in selection of a device from a group of common devices, whereas calls directed to an individual IMS identity imply selection of an associated personal device. More than one device may be associated with an individual IMS identity. Further, a particular device may act both as a common device and a personal one with respect to incoming calls.

If multiple devices support the capabilities proposed in an incoming session invitation, e.g. as specified in an SDP message of an SIP INVITE (compare with step 3:3 in the example above), further factors may be considered for selection of device. For example, a user may be requested to assign devices for incoming calls via some user interface, not further described here. It is also possible to let all devices meeting the capability requirements receive the call, i.e. multiple devices ringing, such that the first device that is "picked up" and accepts the call will be selected for communication. As mentioned above, device priorities may further be defined in the HIG, dictating the selection of device(s). For example, if a user is registered in the HIG, his/her associated device should be selected, if possible with respect to capabilities, whereas if that user is not currently registered, the call should be directed to a voice mail function or similar, etc.

If no single device can support the capability requirements of an incoming call, but two or more devices together would satisfy at least a minimum of the required capabilities, the HIG may be able to direct different components of a media stream of the call to these devices accordingly. For example, a TV device may support a required video codec and a telephone device may support a required audio codec. Then, a video conference could be established where the TV device displays the visual component and the telephone device emits the audio component. The division of media streams to different devices may also be defined as preferences. When divided media streams are used, each media component will receive its own NAT port mapping. It should be evident from the examples given above, that the present invention provides for great flexibility to users when defining rules or policies for device selection.

With reference to steps 4:1-4:8 indicated in FIG. 4, a procedure will now be described for establishing a multimedia session for a non-IMS enabled device 400 included in a private network, in the case of an outgoing call. The participating elements are basically the same as shown in FIG. 3, and the same numerals are therefore used here again. In a first step 4:1, communication unit 312 in HIG 300 receives a session request from the device 400 directed to a remote party, e.g. an IMS enabled terminal or a content server. The received request is given according to protocols within the capability of that device 400.

In a next step 4:2, the request is submitted to the logic unit 314 which then retrieves capabilities, identity information and local IP address of the device 400 from the device database 316, in a following step 4:3. The logic unit 314 orders the communication unit 312 to set up a session for the selected device, using the IMS identity of the HIG towards the IMS network 304, in a next step 4:4. In this step, the logic unit 314 also submits capability data of the selected device to the communication unit 312, to be used during the setup procedure. The local IP address of the selected device is also submitted in step 4:4.

However, if device 400 is associated with an individual IMS identity, i.e. a personal device, the communication unit 312 may use that IMS identity instead of the IMS identity of the HIG. Alternatively, the user may indicate in the session request of step 4:1 that the shared IMS identity of the HIG should be used. Thus, it is preferably up to the user to decide what IMS identity to use.

The communication unit 312 now communicates with the RGW 308 in order to generally establish a communication link for the selected device, in a next step 4:5. This step is basically similar to step 3:5 in the previous example, including the reservation of a port opening in the NAT/firewall of RGW 308 for one or more different media streams of the session. The RGW also provides its public IP address on the access network side. The reserved port of the RGW is then also associated with the local IP address of the device 400. This information will further be associated with a Call ID defining the session, to be given during session setup, and is stored in a session mapping table in the HIG 300, just as described for the previous example.

The communication unit 312 then accordingly exchange conventional signalling messages with the IMS network, e.g. according to SIP, as generally indicated in a following step 4:6, to set up the session with the calling party on behalf of the selected device. In the setup procedure, communication unit 312 sends a session invitation, e.g. SIP INVITE, using the IMS identity of the HIG and capability data of the device 400 received in step 4:4 above and the RGW public IP address and port received in step 4:5, which are provided to the IMS network 304 in an SDP message embedded in an SIP INVITE message. Communication unit 312 also provides the public IP address and reserved port of the RGW 308, typically in the SDP message along with the capabilities, as the point of contact for the forthcoming session. After the session setup with the remote party is finalized, the communication unit has received the remote party's IP address, and the session mapping table is updated accordingly, as described in the previous example.

Next, the communication unit 312 requests the RGW to open the reserved port mappings in the NAT, including the finally negotiated parameters such as the remote party's IP address, in a step 4:7. Finally, the session may begin in a step 4:8, and any incoming media can now be mapped by the NAT in the RGW 308 to the local IP address and port of device 400. Further, a Call ID given during session setup of step 4:6, is stored in a session mapping table in the HIG 300, just as in the previous example.

Figure 4:
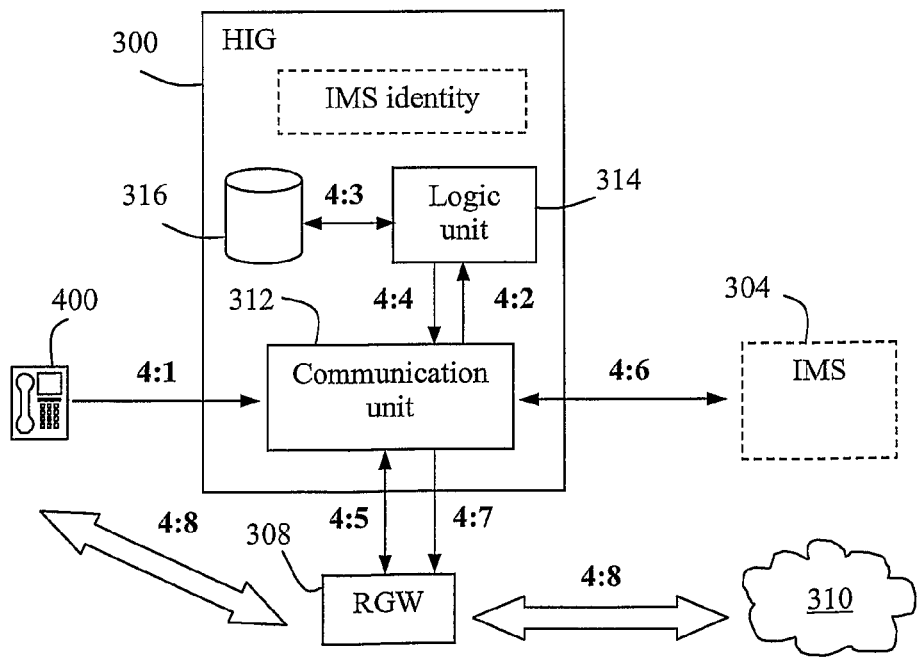
FIG. 4 is a block diagram of the multimedia gateway shown in FIG. 3 when used for setting up a multimedia session for an outgoing call, in accordance with another embodiment.
Figure 5:
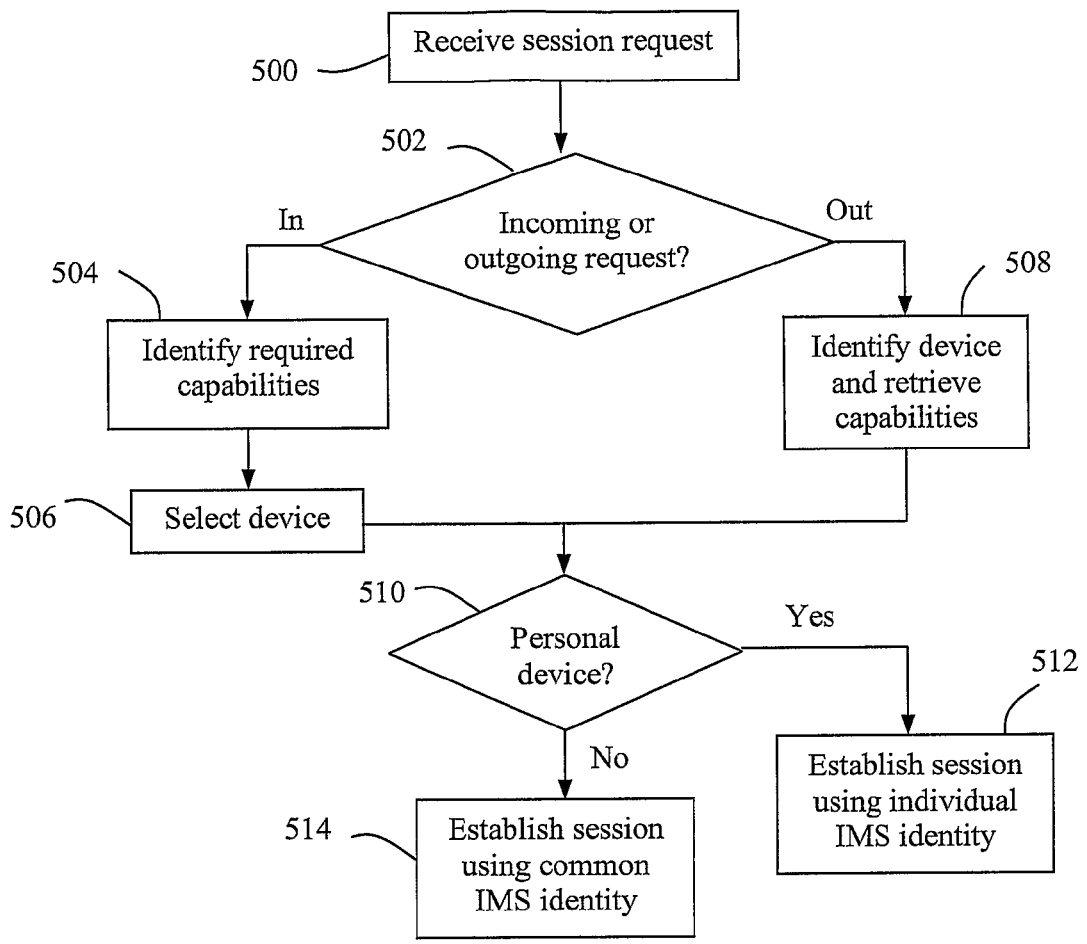
FIG. 5 is a flow chart with steps for setting up a multimedia session using a multimedia gateway, in accordance with another embodiment.

FIG. 5 is a flow chart illustrating different steps for setting up a multimedia session using a multimedia gateway in a private network and a multimedia service network (typically an IMS network), in accordance with another embodiment. The illustrated procedure is generally executed in the multimedia gateway such as the HIG 300 described for FIGS. 3 and 4 above. It is assumed that a single IMS identity has been defined for the multimedia gateway which is valid in the multimedia service network.

In a first step 500, a session request is received which in this description is a general term for either an incoming session invitation from an external party such as in step 3:1 of FIG. 3, or an outgoing session request from an internal device such as in step 4:1 of FIG. 4. In a next step 502, it determined whether the received session request relates to an incoming call or an outgoing call. In the case of an incoming call, required capabilities are determined in a next step 504, which are typically indicated as proposed session parameters, e.g. including at least one codec, in the received session request, e.g. in an SDP message of an SIP INVITE message.

In a next step 506, a suitable and available device is selected that fulfils at least a minimum of the required capabilities, and optionally based on predetermined rules or policies, as in step 3:3 of FIG. 3 described above. As already mentioned, a device selection algorithm may be implemented in the multimedia gateway for the selection operation. For example, if no device is available that fulfil the required capabilities entirely, a device may be chosen that has "comparable" capabilities, and new session parameters can then be negotiated with the calling party in the session setup procedure that follows. Hopefully, new session parameters, e.g. including at least one alternative codec, can be negotiated that can be used by both the calling party and the selected device. Otherwise, it may be necessary to exclude some media component in the resulting session, e.g., a proposed video conference may result in a pure voice call if no video codec can be agreed.

In the case of an outgoing call in step 502, the calling device within the private network is identified and its capabilities and local IP address are retrieved, in a next step 508, as in step 4:3 of FIG. 4 described above.

In a next step 510, it is determined whether the selected or calling device is to be used as a "personal" device, e.g. according to its user. As mentioned above, it is preferably up to the user to decide what IMS identity to use for a session. An individual valid IMS identity may have been assigned to the device, or the user may indicate in a session request whether the shared IMS identity of the HIG, or his/her individual valid IMS identity should be used. If the device is a personal device in this particular session, the session is established using that individual IMS identity, in a following step 512, by means of a regular setup procedure between the multimedia gateway and the multimedia service network, on behalf of the selected or calling device.

On the other hand, if the selected or calling device is not a personal device in step 510, i.e. a device having no individual IMS identity valid in the multimedia service network, the session is established using the IMS identity of the multimedia gateway, in a final illustrated step 514.

Figure 6:
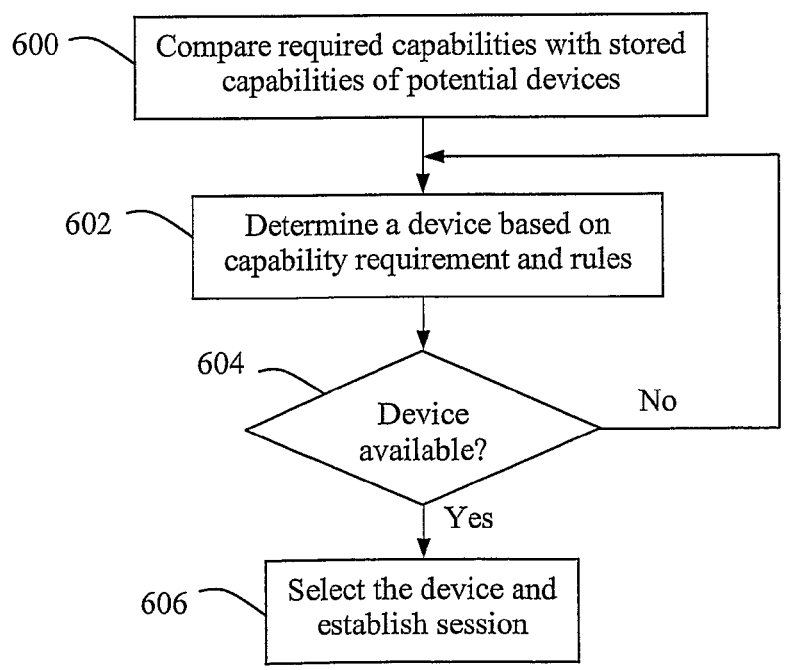
FIG. 6 is a flow chart with steps for selecting a device as part of the procedure illustrated in FIG. 5, in accordance with another embodiment.

FIG. 6 is a flow chart illustrating an exemplary procedure of selecting a device for an incoming call as part of the procedure illustrated in FIG. 5, step 506 in particular, in accordance with yet another embodiment. It is assumed that required capabilities have been identified for the forthcoming session, as in step 504 above. In a first step 600, the required capabilities are compared with stored capabilities of potential devices in the private network, as described for the mapping operation in step 3:3 of FIG. 3. Alternatively, the devices in the private network may provide its capabilities upon request, as subject to the comparison of step 600, instead of having them stored in a device database.

In a next step 602, a suitable device is determined that fulfils at least a minimum of the required capabilities, and also based on predetermined rules or policies, if any, e.g. as exemplified above. In a following step 604, it is further determined whether the device in question is currently available or not, e.g. by checking the status indicated in the third column of the device database structure described above. Different alternatives are available here, such as if the status for a determined suitable device is indicated as "busy", a device selection algorithm may dictate that the incoming call should wait, at least for a predetermined period of time, until the device becomes available again.

If the considered device is found to be available in step 604, it is finally selected for the forthcoming session, as indicated by a final step 606, and the session establishment may continue for the selected device, e.g. according to steps 510-514 in FIG. 5.

As compared to the previously known use of a HIG as described in the background section, the present invention provides for great flexibility in device selection for incoming multimedia calls, optionally based on predefined rules or policies. Among other things, plural devices can be selected for receiving different components of received media, or for receiving the same media. The present invention further results in a reduced number of service identities, IMPU's in particular, that must be defined for terminals in the multimedia service network. The network operator will thus benefit from the management of fewer public identities, such as IMPU's, and its associated subscriber and authentication data.

Further benefits include increased privacy, since devices using the shared service identity will not be discernable to others outside the private network. In other words, neither the network operator nor other users can detect individual device identities and their properties and activities. The efforts for manual configuration, including registration of devices in the multimedia service network, can also be minimised. A user can thus create a private network with "hidden" devices using the shared service identity, which are not registered individually in the multimedia service network.

It is further possible to introduce temporary visitors in the private network, without involving the multimedia service network, which then can obtain access to multimedia services offered by the multimedia service network, using the HIG and its service identity. It is entirely up to the private network user if a visiting device should be allowed to access the multimedia services in this way.

While the invention has been described with reference to specific exemplary embodiments, the description is in general only intended to illustrate the inventive concept and should not be taken as limiting the scope of the invention. For example, the concepts of IMS and HIG have been used throughout when describing the above embodiments, although any other standards and network elements for enabling multimedia communication may basically be used. The present invention is defined by the appended claims.

The invention claimed is:

1. A method of providing access to multimedia services for communication devices connected to a private network, by means of a multimedia gateway in the private network, the multimedia gateway being connected to a multimedia service network and having a service identity which is valid in the multimedia service network, comprising the following steps:

receiving a session request for communication between at least one device in the private network and a remote party, determining if the at least one device in the private network is a personal device, wherein the personal device is a device with an individual valid service identity, and the individual service identity is defined in the multimedia gateway, in response to determining the at least one device in the private network is a personal device, establishing, using the multimedia gateway, a session between the at least one device in the private network and the remote party using the individual valid service identity assigned to the at least one device in the private network, in response to determining the at least one device in the private network is not a personal device, establishing, using the multimedia gateway, a session between the at least one device and the remote party using a negotiation procedure on behalf of at least one device in the private network in response to said session request, using the service identity of the multimedia gateway, and using the capabilities of said at least one device in the private network in the negotiation procedure, storing session specific information in a session mapping table, which can be used for further signaling related to the session and said session specific information includes a Call ID defining the session, a local IP address and selected port of said at least one device, a reserved port of a residential gateway of the private network, and an IP address of a remote party, and wherein the service identity includes an IP Multimedia Public Identity (IMPU).

2. A method according to claim 1, wherein the session request is a session invitation of an incoming request to the private network, and said at least one device is selected from said communication devices based on capability requirements for the session.

3. A method according to claim 2, wherein the capability requirements are indicated by proposed session parameters in the received session invitation, and said session parameters are compared with capabilities of devices in the private network, for selecting said at least one device.

4. A method according to claim 3, wherein said capabilities of devices are retrieved from a device database in the multimedia gateway.

5. A method according to claim 3, wherein said capabilities of devices are retrieved by requesting them from the devices.

6. A method according to claim 3, wherein said device capabilities refer to at least one of: at least one media codec, transmission speed ability and storage capacity.

7. A method according to claim 3, wherein the session invitation is an SIP INVITE message and said proposed session parameters are included in an SDP message embedded in the SIP INVITE message.

8. A method according to claim 2, wherein said at least one device is selected further based on predefined rules or policies.

9. A method according to claim 2, wherein plural devices are selected for the session, for receiving different combined media streams, or for receiving the same media stream(s) simultaneously on the selected devices.

10. A method according to claim 1, wherein individual service identities are assigned in the multimedia gateway for certain persons and/or devices in the private network, such that multimedia sessions can be established on behalf of said persons and/or devices using their corresponding individual service identities and capabilities.

11. A method according to claim 1, wherein the session request relates to an outgoing request from a requesting device of the private network, and capabilities of the requesting device are used when establishing the session.

12. A method according to claim 11, wherein said capabilities of the requesting device are retrieved from a device database in the multimedia gateway.

13. A multimedia gateway of a private network, for providing access to multimedia services for communication devices connected to said private network, the multimedia gateway being connected to a multimedia service network and having a service identity which is valid in the multimedia service network comprising:
   a microprocessor,
   a non-transitory computer-readable storage medium, coupled to the microprocessor, further including computer-readable instructions, when executed by the microprocessor, are configured to:
   receive a session request for communication between at least one device in the private network and a remote party,
   determine if the at least one device is a personal device, wherein the personal device is a device with an individual valid service identity, and the individual service identity is defined in the multimedia gateway,
   in response to determining the at least one device in the private network is a personal device, establish a session between the at least one device in the private network and the remote party using the individual valid service identity assigned to the at least one device in the private network,
   establish a session between the at least one device and the remote party using a negotiation procedure on behalf of said at least one device in the private network in response to said session request, use the service identity of the multimedia gateway, and use the capabilities of said at least one device in the private network in the negotiation procedure, responsive to determining that the at least one device is not a personal device,
   store session-specific information in a session mapping table which can be used for further signaling related to the session, wherein the session specific information includes a Call ID defining the session, a local IP address and selected port of said at least one device, a reserved port of a residential gateway of the private network, and an IP address of a remote party, and
   wherein the service identity includes an IP Multimedia Public Identity (IMPU).

14. An arrangement according to claim 13, wherein the session request is a session invitation of an incoming request to the private network, and the computer-readable instructions, when executed by the microprocessor, are further configured to select said at least one device from said communication devices in the private network based on capability requirements for the session.

15. An arrangement according to claim 14, wherein the capability requirements are indicated by proposed session parameters in the received session invitation, and the computer-readable instructions, when executed by the microprocessor, are further configured to compare said session parameters with capabilities of devices in the private network, for selecting said at least one device.

16. An arrangement according to claim 15, wherein the computer-readable instructions, when executed by the microprocessor, are further configured to retrieve said capabilities of devices in the private network from a device database in the multimedia gateway.

17. An arrangement according to claim 15, wherein the computer-readable instructions, when executed by the microprocessor, are further configured to retrieve said capabilities of devices in the private network by requesting them from the device.

18. An arrangement according to claim 15, wherein said device capabilities refer to at least one of: at least one media codec, transmission speed ability and storage capacity.

19. An arrangement according to claim 15, wherein the session invitation is an SIP INVITE message and said proposed session parameters are included in an SDP message embedded in the SIP INVITE message.

20. An arrangement according to claim 14, wherein the computer-readable instructions, when executed by the microprocessor, are further configured to select said at least one device further based on predefined rules or policies.

21. An arrangement according to claim 14, wherein the computer-readable instructions, when executed by the microprocessor, are further configured to select plural devices for the session, for receiving different combined media streams or for receiving the same media stream(s) simultaneously on the selected devices.

22. An arrangement according to claim 13, wherein the computer-readable instructions, when executed by the microprocessor, are further configured to assign individual service identities in the multimedia gateway for certain persons and/or devices in the private network, such that multimedia sessions can be established on behalf of said persons and/or devices using their corresponding individual service identities.

23. An arrangement according to claim 13, wherein the session request relates to an outgoing request from a requesting device of the private network, wherein the computer-readable instructions, when executed by the microprocessor, are further configured to use capabilities of the requesting device when establishing the session.

24. An arrangement according to claim 23, wherein the computer-readable instructions, when executed by the microprocessor, are further configured to retrieve said capabilities of the requesting device from a device database in the multimedia gateway.

* * * * *

UNITED STATES PATENT AND TRADEMARK OFFICE
CERTIFICATE OF CORRECTION

| | | |
|---|---|---|
| PATENT NO. | : 8,543,705 B2 | Page 1 of 1 |
| APPLICATION NO. | : 12/094831 | |
| DATED | : September 24, 2013 | |
| INVENTOR(S) | : Cagenius | |

It is certified that error appears in the above-identified patent and that said Letters Patent is hereby corrected as shown below:

In the Specification

In Column 6, Line 63, delete "DESCRIPTION" and insert -- DETAILED DESCRIPTION --, therefor.

In the Claims

In Column 16, Line 17, in Claim 17, delete "device." and insert -- devices. --, therefor.

Signed and Sealed this
Eleventh Day of February, 2014

Michelle K. Lee
*Deputy Director of the United States Patent and Trademark Office*